United States Patent
Sutula, Jr.

[11] Patent Number: 5,159,775
[45] Date of Patent: Nov. 3, 1992

[54] SUPPORT HANDLE FOR A FISHING ROD

[76] Inventor: Daniel P. Sutula, Jr., 135 Debra La., Bristol, Conn. 06010

[21] Appl. No.: 691,860

[22] Filed: Apr. 26, 1991

[51] Int. Cl.⁵ .............................................. A01K 97/10
[52] U.S. Cl. ..................................... 43/21.2; 224/219; 224/922; 294/58
[58] Field of Search ...................... 43/25, 21.2, 23, 22; 294/58, 25; 224/922, 219, 218, 222, 267

[56] References Cited

U.S. PATENT DOCUMENTS

| | | | |
|---|---|---|---|
| 513,875 | 1/1894 | Burriss | 294/25 |
| 712,843 | 11/1902 | Paul | 294/58 |
| 2,149,837 | 3/1939 | Browne | 43/23 |
| 2,158,104 | 5/1939 | Bowen | 43/25 |
| 2,653,406 | 9/1953 | Grabiak et al. | |
| 2,869,276 | 1/1959 | Hagen | |
| 3,372,509 | 3/1968 | Arsenault | |
| 3,372,510 | 3/1968 | Arsenault | |
| 4,559,735 | 12/1985 | Batick, Jr. | 43/25 |
| 4,624,069 | 11/1986 | Schneider | 43/21.2 |
| 4,759,306 | 7/1988 | McKenzie | 294/25 |
| 4,993,766 | 2/1991 | Sutherland | 294/25 |

FOREIGN PATENT DOCUMENTS 2123675  2/1984  United Kingdom ................. 43/21.2

OTHER PUBLICATIONS

P. 57 from 1991 Spring/Summer Catalog for Gander Mountain Supplies.

Primary Examiner—Richard K. Seidel
Assistant Examiner—James Miner
Attorney, Agent, or Firm—Donald S. Holland

[57] ABSTRACT

A fishing rod with a support handle is disclosed wherein the handle is designed to distribute force along its multiple points. Two embodiments are shown. In the preferred embodiment, the handle includes a hook-shaped wrist support that wraps around the majority of the user's wrist, but allows easy access and exit; a forearm cradle that cups the user's arm, near his elbow; and a strap that holds the arm in the cradle. In an alternate embodiment, the wrist support is tunnel-shaped and surrounds the user's entire wrist.

15 Claims, 2 Drawing Sheets

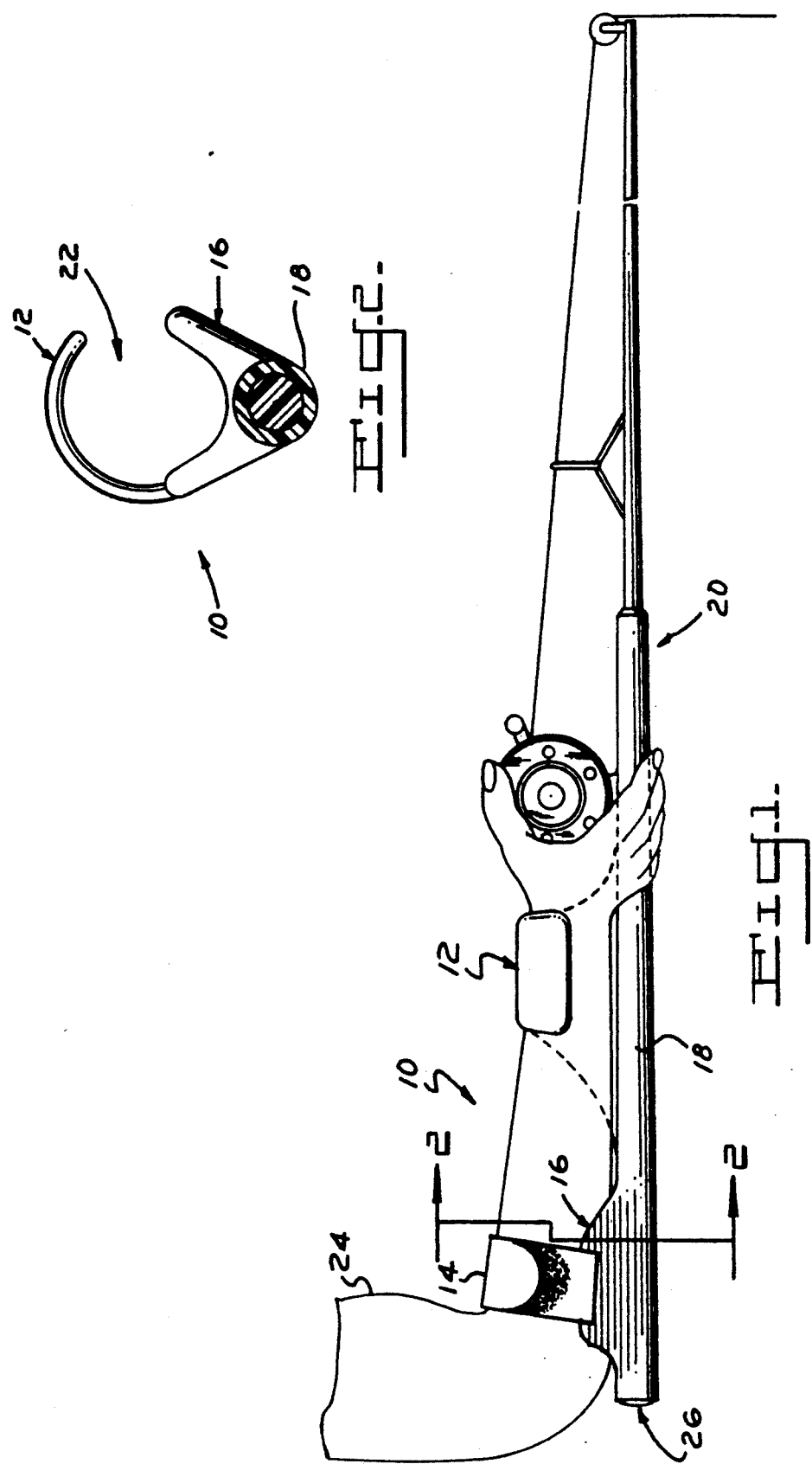

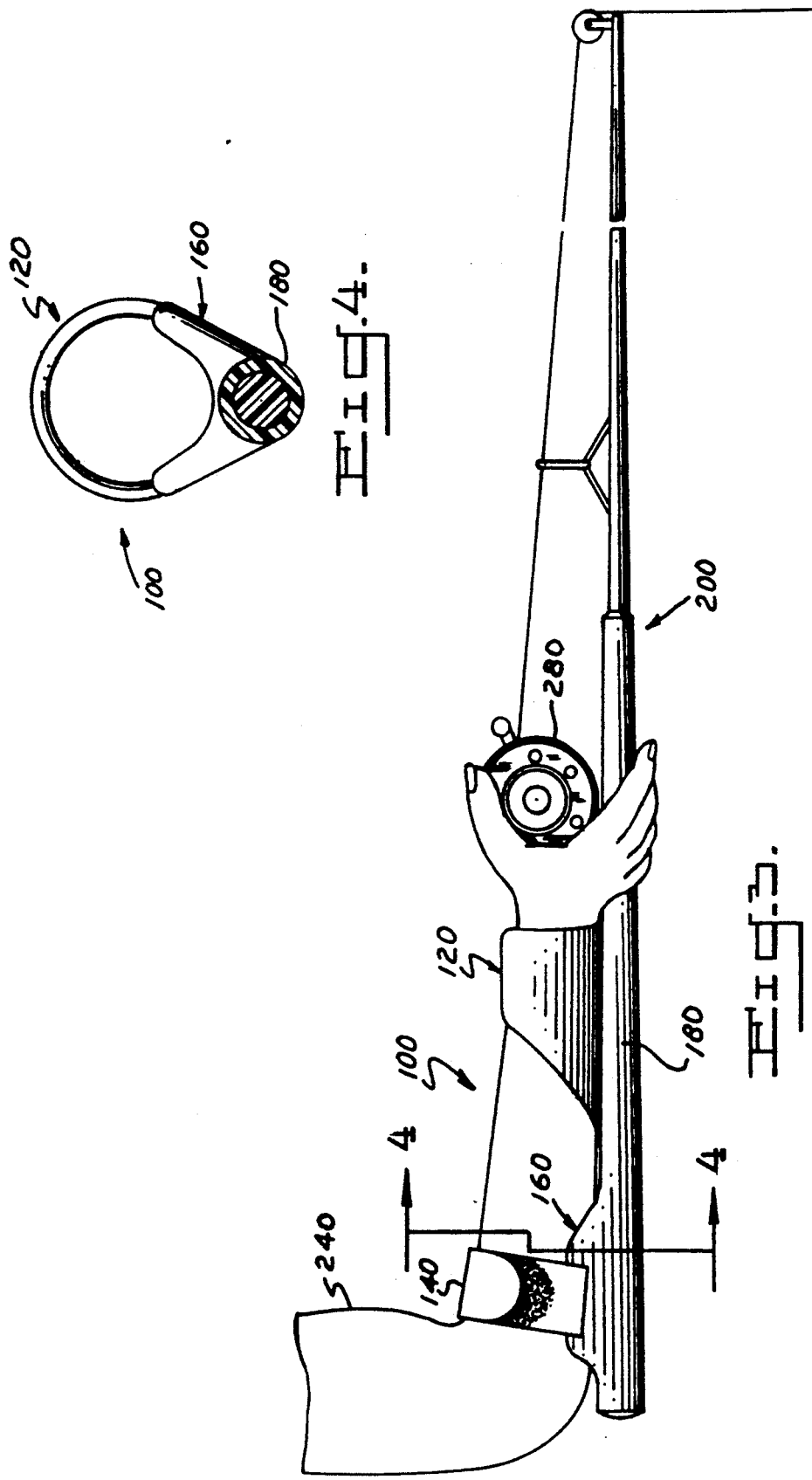

SUPPORT HANDLE FOR A FISHING ROD

BACKGROUND OF THE INVENTION

The present invention relates to fishing rods and more particularly to devices used to reduce the user's fatigue due to excessive forces exerted because of large fish.

Consumer demand has driven high-tech fishing equipment into the market place. Even though a fisherman may be surrounded by innovative new products, certain fishing rods remain relatively unchanged by time and primitive in comparison to other fishing gear.

In particular, "boat rods" have received very little attention; consequently, they remain relatively archaic in design. As used in the present application, the term "boat rod" refers to a relatively short, stiff fishing rod. The boat rod, which requires no casting, is designed for use over the side of a boat in relatively deep water.

In order to catch any fish at all, the fisherman must first attract the fish's attention. Three common techniques are used: baitfishing, jigging and trolling. Baitfishing is the use of edible bait, either live or dead, to entice the fish to feed on a baited hook. Trolling is the practice of dragging a lure below and behind the boat in a horizontal fashion. Jigging, on the other hand, presents a lure to a fish in a more vertical fashion. The lure is lowered into the water and retrieved in an upward, jerking manner. It is this repeated jigging for which boat rods are particularly poorly suited.

When jigging for smaller fish, the fisherman typically supports the rod with one hand around the rod and reel while the forearm is braced so that the butt portion of the rod is beneath it. Unfortunately, the boat rod was not designed for this position. In this position, the support hand alone must support any external forces exerted on the rod. The wrist must counter any moments about the vertical axis, as well as about the axis of the rod, in order to maintain the rod butt's contact with the forearm. This requires an enormous amount of strength, stamina and coordination in the hand and wrist of the user's support arm. As a result, this position is exceptionally tiring when used for long periods of time; and on fishing expeditions, it is not uncommon for this position to be used for extended periods of time.

Consequently, there have been some inventions which have attempted to alleviate this tiresome problem. Typically, these inventions provide a handgrip. These handgrips often do not grip the hand that is using the reel crank. If a handgrip is used, it often becomes tiring for the fisherman due to the excessive force that his hand must exert over a long period of time.

At least one invention tried to counter this excessive hand fatigue by providing an additional means of support. However, even this extra support is not without faults. In U.S. Pat. No. 2,149,837 to Browne, the support is a less-than-semicircular device, placed under the elbow, which is used in conjunction with a handgrip. While this may allow the user some additional support, it does not totally alleviate hand fatigue. More particularly, this device does not take advantage of the forearm and its ability to absorb force.

One invention which did try to take advantage of the forearm's ability to absorb forces is described in U.S. Pat. No. 2,869,276 to Hagen. Hagen discloses an arm brace, but no elbow cradle. In particular, Hagen's arm brace is very narrow—that is, a "single point" force of distribution. Although Hagen realizes the arm's ability to distribute forces, he fails to take advantage of the whole forearm.

Consequently, it is the primary object of this invention to provide an improved boat rod which alleviates some of the force from the user's wrist and hand.

It is another general object to provide a fishing rod with a unique support handle which provides a multipoint area of distribution of force along the forearm.

It is a more specific object to provide an improved fishing rod which allows quick and easy access in and out of the "support" apparatus so as to maximize its safety.

The above and other objects and advantages of this invention will become more readily apparent when the following description is read in conjunction with the accompanying drawings.

BRIEF DESCRIPTION OF THE DRAWINGS

FIG. 1 is a side view of a fisherman using a "hook-type" support handle constructed in accordance with the present invention;

FIG. 2 is a cross-sectional view taken along line 2—2 of FIG. 1, with the cross-hatching omitted from an illustrated forearm cradle for the sake of clarity;

FIG. 3 is a side view of a fisherman using an alternative embodiment—namely, a "tunnel-type" support handle; and FIG. 4 is a cross-sectional view taken along line 4—4 of FIG. 3, with cross-hatching omitted again from an illustrated cradle.

DETAILED DESCRIPTION OF THE PREFERRED EMBODIMENTS

Referring to the drawings in detail, a preferred embodiment of a fishing handle is shown and generally designated by the reference numeral 10 (see FIGS. 1-2). The preferred handle 10 is comprised of four main parts: a wrist and-forearm support (hook-type) 12 (hereinafter wrist support 12); a forearm strap 14; a forearm cradle 16; and a rod shaft 18.

The wrist support 12, cradle 16 and shaft 18 are all made of the same material—namely, any suitable plastic such as polyester reinforced fiberglass. Though they are ideally molded or cast together as part of an original-equipment rod 20, they could be retrofitted onto an existing rod.

As best shown in FIG. 2, the wrist support 12 resembles a hook. It extends upwardly from one side of rod shaft 18, along the shaft's midlength. The support 12 is designed to wrap around and straddle both the user's wrist and a large portion of the user's forearm. The hook has an opening 22, which must be large enough to allow the user 24 to enter or exit it, safely and quickly. Though not shown, the hook has a neoprene padding on its inside to maximize user comfort.

This "hook" design is equally well-suited for both left- and right-handed users. The illustrated hook 12 is for a right-handed user 24. It has a "clockwise" curve that extends from the left side of rod shaft 18, as viewed in FIG. 2. A mirror image could be used for a left-handed user (not shown), in which the hook would curve counterclockwise, and extend from the opposite side of the rod.

The forearm strap 14 works in conjunction with the forearm cradle 16 and the wrist support to maximize the stability of the rod 20 while in use. The strap 14 may be designed of any strong, flexible material such as VEL- CRO ®, such as that manufactured by VELCRO USA, Inc. of Manchester, New Hampshire. The strap 14 is ideally attached to the forearm cradle 16 during the molding procedure employed to make the rod handle (hook-type) 10. The strap 14 must be sufficiently long to enable each user to fasten his arm securely into the forearm cradle 16.

The cradle 16 is located near the butt end 26 of shaft 18. It is U-shaped and designed to cup the bottom of a user's arm, near his elbow. Like the wrist support 12, this forearm or "elbow" cradle 16 also has a neoprene padding (not shown) for the user's comfort. In order to accommodate the various sizes of user's arms, additional padding may be added to the forearm cradle 16 and/or the wrist support 12.

FIGS. 1-2 also show the operational use of the rod handle (hook-type) 10. First, a right-handed user 24 would grasp the fishing rod 20 between the forearm cradle 16 and the wrist support 12 with his left hand. Then, he would insert his right wrist under and upward through the hook-type wrist support 12. Next, he would slide his right arm back until it fit snugly into the forearm cradle 16. Afterwards, he would wrap the forearm strap 14 over his arm and securely fasten the strap 14.

Since this hook 12 covers a great deal of the user's forearm, it provides a large surface area over which force may be exerted. As a result, the forearm literally becomes an extension of the fishing rod over which force may be transmitted.

When in use, the handle 10 acts as a "passive" support for the rod 20. The reaction forces are distributed along the upper and lower surfaces of the supporting forearm at the wrist and elbow, respectively. The geometry of the handle 10 was designed to provide a comfortable distribution of forces at these locations, and thus, transmit the forces to the user's forearm passively. The combination of the forearm cradle 16 and the wrist support 12 provides this passive transition.

This concludes the design and operation of the "hook-type" handle. Next, the design and operation of an alternative embodiment, the "tunnel-type" design, will be discussed.

Like the hook-type rod handle 10, shown in FIGS. 1-2, the tunnel-type rod handle 100 is also comprised of four main parts: a wrist and-forearm support (tunnel-type) 120 (hereinafter wrist support 120), a forearm strap 140, a forearm cradle 160, and a rod shaft 180. This handle 100 is removably attached to a fishing rod 200. See FIGS. 3-4.

The rod handle (tunnel-type) 100 is manufactured from the same materials as the rod handle (hook-type) 10. For example, the wrist support (tunnel-type) 120 and the forearm cradle 160 are both made of a polyester reinforced fiberglass, like that described for the wrist support (hook-type) 12 and the forearm cradle 16. Likewise, the same type VELCRO ® would be used for the forearm strap 140 as was used for the forearm strap 14.

The wrist support (tunnel-type) 120, the forearm strap 140, the forearm cradle 160, and the rod shaft 180 are integrally attached through a molding process.

Although the manufacturing materials for both the rod handle (hook-type) 10 and the rod handle (tunnel-type) 100 are substantially the same, the design and operational use of the two differ significantly.

The wrist support (tunnel-type) 120 begins at the forearm's midpoint and extends to the wrist. Both sides taper up and around the user's forearm to form a tunnel. The tapering occurs up so as to only cover about one-quarter of the user's forearm. The tunnel is sufficiently large to allow a user 240 to easily and quickly enter and exit the wrist support 120. Also, the wrist support 120 provides ample space for the user to turn and flex his wrist. In addition, the user's ability to grasp the reel 280 should not be hindered. As designed, the rod handle (tunnel-type) 100 works equally well for both left- and right-handed persons.

In its present embodiment, the rod handle (tunnel-type) 100 provides a large surface area over which the user may exert force. In addition, the force may be in either the horizontal or vertical plane. Force in either plane will not cause the arm to become dislodged.

As extra support, the fisherman is also provided with both a forearm strap 140 and a forearm cradle 160. The forearm strap 140 must be long enough to enable each user to securely fasten his arm into the forearm cradle 160.

FIGS. 3-4 also show the operational use of the rod handle (tunnel-type) 100. First, a right-handed user 240 would grasp the fishing rod 200 between the forearm cradle 160 and the wrist support (tunnel-type) 120 with his left hand. Then, he would insert his right wrist through tunnel-type wrist support 120 until his hand could touch the reel 280. Next, he would slide his right arm back until it fit snugly into the forearm cradle 160. Afterwards, he would wrap the forearm strap 140 over his arm and securely fasten the forearm strap 140. See FIG. 3.

It should be understood by those skilled in the art that obvious modifications can be made without departing from the spirit of the invention. For example, both the preferred embodiment and the alternative embodiment could be made of cast aluminum or magnesium, machined aluminum or any other suitable material. Accordingly, reference should be made primarily to the accompanying claims, rather than the foregoing specification, to determine the scope of the invention.

Having thus described the invention, what is claimed is:

1. A fishing rod handle comprising:
  a. a rod shaft, wherein said rod shaft has a longitudinal axis;
  b. a forearm-and-wrist support fixedly attached to the shaft in stationary position relative thereto, along the shaft's mid length, wherein the support has an arcuate portion that extends upwardly from the shaft and which is adapted in size and shape to wrap around and straddle the majority of the circumference of a user's wrist and at least a portion of that user's forearm, wherein the forearm-and-wrist support is made of rigid plastic so as to always retain its shape and position relative to the longitudinal axis of the rod shaft, wherein the entire wrist support maintains its position relative to the longitudinal axis and acts as a passive restraint so that force can be transmitted from the rod, through the plastic support and to the user's forearm without the user grasping the rod and without the support changing its shape or position relative to the shaft, and wherein the user's arm remains parallel to the shaft at all times;
  c. a forearm cradle attached to the shaft, adjacent a butt end of the shaft, wherein the cradle has an upwardly opening curved portion that is adapted in size and shape to cup the user's forearm, near his elbow; and d. a forearm strap, connected to the cradle, which is adapted in size to overlie the user's forearm and hold it in the cradle.

2. The fishing rod handle of claim 1 wherein the arcuate wrist support is shaped like a hook, with a side opening for entry and exit of the user's forearm.

3. The fishing rod handle of claim 1 wherein the arcuate wrist support is shaped like a tubular tunnel, whereby the support is adapted to wrap around the entire circumference of a user's wrist.

4. The fishing rod handle of claim 1 wherein the arcuate wrist support has padding adapted in size and shape to accommodate the user's forearm.

5. The fishing rod handle of claim 1 wherein the forearm cradle is U-shaped.

6. The fishing rod handle of claim 1 wherein the forearm strap is VELCRO ®.

7. A support handle for a fishing rod comprising:
 a. a rod shaft, wherein said rod shaft has a longitudinal axis;
 b. a forearm-and-wrist support means, fixedly attached to the shaft in stationary position relative thereto, for wrapping and straddling the majority of the circumference of a user's wrist and at least a portion of that user's forearm, wherein the forearm-and-wrist support is made of rigid plastic so as to always retain its shape and position relative to the longitudinal axis of the rod shaft, wherein the entire wrist support maintains its position relative to the longitudinal axis and acts as a passive restraint so that force can be transmitted from the rod, through the plastic support and to the user's forearm without the user grasping the rod and without the support changing its shape or position relative to the shaft, and wherein the user's arm remains parallel to the shaft at all times;
 c. a forearm cradle means, attached to the shaft, to cup the user's forearm near his elbow; and
 d. a forearm strap, connected to the cradle means, which is adapted in size to overlie the user's forearm and hold it in the cradle.

8. The fishing rod handle of claim 7 wherein the wrist support has an arcuate portion shaped like a hook, with a side opening for entry and exit of the user's forearm.

9. The fishing rod handle of claim 7 wherein the wrist support means has an arcuate portion shaped like a tubular tunnel, whereby the support is adapted to wrap around the entire circumference of a user's wrist.

10. The fishing rod handle of claim 7 wherein the forearm cradle means is U-shaped.

11. The fishing rod handle of claim 7 wherein the forearm strap is VELCRO ®.

12. A fishing rod handle comprising:
 a. a rod shaft, wherein said rod shaft has a longitudinal axis; and
 b. a forearm-and-wrist support fixedly attached to the shaft in stationary position relative thereto, along the shaft's midlength, wherein the support has an arcuate portion that extends upwardly from the shaft and which is adapted in size and shape to wrap around and straddle the majority of the circumference of a user's wrist and at least a portion of that user's forearm, wherein the forearm-and-wrist support is made of rigid plastic so as to always retain its shape and position relative to the longitudinal axis of the rod shaft, wherein the entire wrist support maintains its position relative to the longitudinal axis and acts as a passive restraint so that force can be transmitted from the rod, through the plastic support and to the user's forearm without the user grasping the rod and without the support changing its shape or position relative to the shaft, and wherein the user's arm remains parallel to the shaft at all times.

13. The fishing rod handle of claim 12 wherein the arcuate wrist support is shaped like a hook, with a side opening for entry and exit of the user's forearm.

14. The fishing rod handle of claim 12 wherein the arcuate wrist support is shaped like a tubular tunnel, whereby the support is adapted to wrap around the entire circumference of a user's wrist.

15. A support for a fishing rod comprising:
 a. a rod shaft, wherein said rod shaft has a longitudinal axis; and
 b. a forearm-and-wrist support means, fixedly attached to the shaft in stationary position relative thereto, for wrapping and straddling the majority of the circumference of a user's wrist and at least a portion of that user's forearm, wherein the forearm-and-wrist support is made of rigid plastic so as to always retain its shape and position relative to the longitudinal axis of the rod shaft, wherein the entire wrist support maintains its position relative to the longitudinal axis and acts as a passive restraint so that force can be transmitted from the rod, through the plastic support and to the user's forearm without the user grasping the rod and without the support changing its shape or position relative to the shaft, and wherein the user's arm remains parallel to the shaft at all times.

* * * * *